United States Patent
Steinhauser et al.

(10) Patent No.: US 10,975,750 B2
(45) Date of Patent: Apr. 13, 2021

(54) HEATER-ACTUATED FLOW BYPASS

(71) Applicant: WATLOW ELECTRIC MANUFACTURING COMPANY, St. Louis, MO (US)

(72) Inventors: Louis P. Steinhauser, St. Louis, MO (US); Mark D. Everly, St. Charles, MO (US); George F. Jambor, Dover, MN (US); Jacob Lindley, St. Louis, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 343 days.

(21) Appl. No.: 15/448,162

(22) Filed: Mar. 2, 2017

(65) Prior Publication Data

US 2017/0254250 A1 Sep. 7, 2017

Related U.S. Application Data

(60) Provisional application No. 62/302,482, filed on Mar. 2, 2016.

(51) Int. Cl.
*F01N 3/023* (2006.01)
*F01N 9/00* (2006.01)
(Continued)

(52) U.S. Cl.
CPC .............. *F01N 9/005* (2013.01); *F01N 3/023* (2013.01); *F01N 3/027* (2013.01); *F01N 3/2006* (2013.01);
(Continued)

(58) Field of Classification Search
CPC .. F01N 11/002; F01N 11/005; F01N 13/0097; F01N 3/023; F01N 3/027;
(Continued)

(56) References Cited

U.S. PATENT DOCUMENTS 5,144,796 A 9/1992 Swars
5,209,960 A 5/1993 Ping
(Continued)

FOREIGN PATENT DOCUMENTS

DE 19720205 11/1998
DE 102004052107 5/2006
(Continued)

OTHER PUBLICATIONS

International Search Report for International Application PCT/US2017/020516, dated May 15, 2018.

*Primary Examiner* — Matthew T Largi
(74) *Attorney, Agent, or Firm* — Burris Law, PLLC

(57) ABSTRACT

A fluid control system is provided that in one form includes a first flow channel, a second flow channel, a heater disposed in the second flow channel, and a fluid control device disposed upstream from the first and second flow channels. When the heater is turned on, the fluid control device changes a fluid flow rate through at least one of the first flow channel and the second flow channel. In another form, the fluid control system includes a bypass conduit, a heater disposed within the bypass conduit, and a fluid control device disposed near the inlet and outlet of the bypass conduit. In still another form, the fluid control system includes a regeneration device disposed downstream from at least one exhaust aftertreatment system and closes an outlet of the exhaust pipe.

19 Claims, 6 Drawing Sheets

(51) Int. Cl.

| | | |
|---|---|---|
| *F01N 11/00* | (2006.01) | |
| *F01N 3/027* | (2006.01) | |
| *G01F 1/68* | (2006.01) | |
| *H05B 1/02* | (2006.01) | |
| *F01N 13/00* | (2010.01) | |
| *F02D 41/02* | (2006.01) | |
| *F02D 41/14* | (2006.01) | |
| *G05D 23/185* | (2006.01) | |
| *F01N 3/20* | (2006.01) | |
| *F02D 41/22* | (2006.01) | |
| *G01M 15/05* | (2006.01) | |
| *G07C 5/08* | (2006.01) | |
| *H05B 3/20* | (2006.01) | |
| *H05B 3/40* | (2006.01) | |
| *G01K 7/16* | (2006.01) | |
| *G05D 23/24* | (2006.01) | |
| *G05D 23/30* | (2006.01) | |
| *H05B 3/14* | (2006.01) | |
| *G01F 1/86* | (2006.01) | |
| *H05B 3/18* | (2006.01) | |
| *H05B 3/00* | (2006.01) | |
| *F01N 3/10* | (2006.01) | |
| *F01N 3/021* | (2006.01) | |
| *F01N 3/08* | (2006.01) | |
| *H01C 7/02* | (2006.01) | |
| *H01C 7/04* | (2006.01) | |

(52) U.S. Cl.
CPC ............. *F01N 3/2013* (2013.01); *F01N 9/00* (2013.01); *F01N 9/002* (2013.01); *F01N 11/002* (2013.01); *F01N 11/005* (2013.01); *F01N 13/0097* (2014.06); *F02D 41/024* (2013.01); *F02D 41/1446* (2013.01); *F02D 41/1447* (2013.01); *F02D 41/22* (2013.01); *F02D 41/222* (2013.01); *G01F 1/68* (2013.01); *G01F 1/86* (2013.01); *G01K 7/16* (2013.01); *G01M 15/05* (2013.01); *G05D 23/185* (2013.01); *G05D 23/2401* (2013.01); *G05D 23/30* (2013.01); *G07C 5/0808* (2013.01); *H05B 1/0227* (2013.01); *H05B 1/0244* (2013.01); *H05B 3/0042* (2013.01); *H05B 3/141* (2013.01); *H05B 3/18* (2013.01); *H05B 3/20* (2013.01); *H05B 3/40* (2013.01); *F01N 3/021* (2013.01); *F01N 3/0814* (2013.01); *F01N 3/103* (2013.01); *F01N 3/106* (2013.01); *F01N 3/2066* (2013.01); *F01N 2240/10* (2013.01); *F01N 2240/16* (2013.01); *F01N 2240/36* (2013.01); *F01N 2410/00* (2013.01); *F01N 2410/04* (2013.01); *F01N 2550/22* (2013.01); *F01N 2560/06* (2013.01); *F01N 2560/07* (2013.01); *F01N 2560/12* (2013.01); *F01N 2560/20* (2013.01); *F01N 2610/102* (2013.01); *F01N 2900/0416* (2013.01); *F01N 2900/1404* (2013.01); *F01N 2900/1406* (2013.01); *F01N 2900/1411* (2013.01); *F01N 2900/1602* (2013.01); *F02D 2041/1433* (2013.01); *F02D 2041/228* (2013.01); *F28F 2200/00* (2013.01); *G01K 2205/04* (2013.01); *H01C 7/02* (2013.01); *H01C 7/04* (2013.01); *H05B 2203/019* (2013.01); *H05B 2203/021* (2013.01); *H05B 2203/022* (2013.01); *Y02T 10/12* (2013.01); *Y02T 10/40* (2013.01)

(58) Field of Classification Search
CPC ........ F01N 3/2006; F01N 3/2013; F01N 9/00; F01N 9/002; F02D 41/024; F02D 41/1446; F02D 41/1447; F02D 41/22; F02D 41/222
See application file for complete search history.

(56) References Cited

U.S. PATENT DOCUMENTS

| | | | |
|---|---|---|---|
| 5,233,970 A | 8/1993 | Harris | |
| 5,279,117 A | 1/1994 | Kaiser | |
| 5,310,327 A | 5/1994 | Phillips | |
| 5,373,033 A | 12/1994 | Toh et al. | |
| 5,393,499 A * | 2/1995 | Bagley | F01N 3/2026 422/174 |
| 5,410,875 A * | 5/1995 | Tanaka | B01D 53/944 60/288 |
| 5,553,451 A | 9/1996 | Harada | |
| 5,560,757 A * | 10/1996 | Suzuki | B01D 39/2082 55/516 |
| 5,582,003 A * | 12/1996 | Patil | F01N 13/017 60/284 |
| 5,603,216 A * | 2/1997 | Guile | F01N 3/0835 60/288 |
| 5,611,831 A * | 3/1997 | Matsuoka | B01D 39/2003 55/486 |
| 5,620,490 A * | 4/1997 | Kawamura | F01N 3/0226 55/282.3 |
| 5,651,248 A * | 7/1997 | Kawamura | B01D 46/0063 55/283 |
| 5,655,366 A * | 8/1997 | Kawamura | F01N 3/0212 55/487 |
| 5,716,133 A | 2/1998 | Osokawa et al. | |
| 5,738,832 A | 4/1998 | Dogahara et al. | |
| 7,251,929 B2 | 8/2007 | Hu et al. | |
| 7,403,704 B2 | 7/2008 | Eccleston et al. | |
| 7,434,387 B2 | 10/2008 | Yan | |
| 8,361,422 B2 | 1/2013 | Soukhojak et al. | |
| 8,652,259 B2 | 2/2014 | Poppe et al. | |
| 9,188,036 B2 * | 11/2015 | Degen | F01N 3/0835 |
| 9,212,422 B2 | 12/2015 | Higashi et al. | |
| 9,506,386 B2 | 11/2016 | Brunel | |
| 10,145,279 B2 | 12/2018 | Hussain et al. | |
| 2002/0005178 A1 | 1/2002 | Iwatani et al. | |
| 2002/0139114 A1 | 10/2002 | Dickau | |
| 2005/0115224 A1 | 6/2005 | Kojima | |
| 2008/0196408 A1* | 8/2008 | Li | F01N 3/34 60/605.2 |
| 2009/0038302 A1* | 2/2009 | Yamada | F01N 3/0205 60/320 |
| 2010/0126155 A1* | 5/2010 | Garcia | F01N 13/082 60/317 |
| 2010/0319331 A1 | 12/2010 | Wagner et al. | |
| 2011/0214569 A1 | 9/2011 | Gonze et al. | |
| 2012/0144812 A1 | 6/2012 | Hyun | |
| 2012/0152487 A1 | 6/2012 | Styles et al. | |
| 2012/0198821 A1 | 8/2012 | Soukhojak et al. | |
| 2013/0031889 A1* | 2/2013 | Roos | F01N 9/00 60/274 |
| 2013/0081626 A1 | 4/2013 | Pujol et al. | |
| 2013/0199751 A1 | 8/2013 | Levin et al. | |
| 2014/0190151 A1 | 7/2014 | Culbertson et al. | |
| 2015/0089943 A1 | 4/2015 | Hussain et al. | |
| 2015/0143811 A1 | 5/2015 | Pang et al. | |
| 2015/0152766 A1 | 6/2015 | Brunel | |
| 2015/0247651 A1 | 9/2015 | Hariu et al. | |

FOREIGN PATENT DOCUMENTS

| | | |
|---|---|---|
| DE | 102012111335 | 5/2013 |
| EP | 0699828 | 3/1996 |
| EP | 2146071 | 1/2010 |
| GB | 2403791 | 1/2005 |

(56) References Cited

FOREIGN PATENT DOCUMENTS

| | | |
|---|---|---|
| JP | H110184346 | 7/1998 |
| WO | 2015/046506 | 4/2015 |
| WO | 2016/009259 | 1/2016 |

* cited by examiner

HEATER-ACTUATED FLOW BYPASS

CROSS-REFERENCE TO RELATED APPLICATIONS

This application claims priority to and the benefit of U.S. provisional application Ser. No. 62/302,482, filed on Mar. 2, 2016, the contents of which are incorporated herein by reference in their entirety. This application is also related to co-pending applications titled "Bare Heating Elements for Heating Fluid Flows," "Virtual Sensing System," "Advanced Two-Wire Heater System for Transient Systems," "Heater Element Having Targeted Decreasing Temperature Resistance Characteristics," "System for Axial Zoning of Heating Power," "Dual-Purpose Heater and Fluid Flow Measurement System," "Susceptor for Use in a Fluid Flow System," and "Thermal Storage Device for Use in a Fluid Flow System," concurrently filed herewith and commonly assigned with the present application, the contents of which are incorporated herein by reference in their entirety.

FIELD

The present disclosure relates to heating and sensing systems for fluid flow applications, for example vehicle exhaust systems, such as diesel exhaust and aftertreatment systems.

BACKGROUND

The statements in this section merely provide background information related to the present disclosure and may not constitute prior art.

The use of physical sensors in transient fluid flow applications such as the exhaust system of an engine is challenging due to harsh environmental conditions such as vibration and thermal cycling. One known temperature sensor includes a mineral insulated sensor inside a thermowell that is then welded to a support bracket, which retains a tubular element. This design, unfortunately, takes a long amount of time to reach stability, and high vibration environments can result in damage to physical sensors.

Physical sensors also present some uncertainty of the actual resistive element temperature in many applications, and as a result, large safety margins are often applied in the design of heater power. Accordingly, heaters that are used with physical sensors generally provide lower watt density, which allows a lower risk of damaging the heater at the expense of greater heater size and cost (same heater power spread over more resistive element surface area).

Moreover, known technology uses an on/off control or PID control from an external sensor in a thermal control loop. External sensors have inherent delays from thermal resistances between their wires and sensor outputs. Any external sensor increases the potential for component failure modes and sets limitations of the any mechanical mount to the overall system.

One application for heaters in fluid flow systems is vehicle exhausts, which are coupled to an internal combustion engine to assist in the reduction of an undesirable release of various gases and other pollutant emissions into the atmosphere. These exhaust systems typically include various after-treatment devices, such as diesel particulate filters (DPF), a catalytic converter, selective catalytic reduction (SCR), a diesel oxidation catalyst (DOC), a lean $NO_x$ trap (LNT), an ammonia slip catalyst, or reformers, among others. The DPF, the catalytic converter, and the SCR capture carbon monoxide (CO), nitrogen oxides ($NO_x$), particulate matters (PMs), and unburned hydrocarbons (HCs) contained in the exhaust gas. The heaters may be activated periodically or at a predetermined time to increase the exhaust temperature and activate the catalysts and/or to burn the particulate matters or unburned hydrocarbons that have been captured in the system.

The heaters are generally installed in exhaust pipes or components such as containers of the exhaust system. The heaters may include a plurality of heating elements within the exhaust pipe and are typically controlled to the same target temperature to provide the same heat output. However, a temperature gradient typically occurs because of different operating conditions, such as different heat radiation from adjacent heating elements, and exhaust gas of different temperature that flows past the heating elements.

The life of the heater depends on the life of the heating element that is under the harshest heating conditions and that would fail first. It is difficult to predict the life of the heater without knowing which heating element would fail first. To improve reliability of all the heating elements, the heater is typically designed to be operated with a safety factor to reduce and/or avoid failure of any of the heating elements. Therefore, the heating elements that are under the less harsh heating conditions are typically operated to generate a heat output that is much below their maximum available heat output.

SUMMARY

In one form of the present disclosure, a fluid control system is provided that includes a first flow channel, a second flow channel in fluid communication with the first flow channel, a heater disposed proximate at least one of the first flow channel and the second flow channel, and a fluid control device disposed upstream from the first and second flow channel. The fluid control device is operable to be actuated when the heater is turned on, thereby changing a fluid flow rate in at least one of the first flow channel and the second flow channel. Actuating the fluid control device in one form causes fluid to flow through the second flow channel, in another form prevents fluid from flowing through the first flow channel when fluid is flowing through both channels, and in another form partially re-directs a portion of the fluid flow through the second flow channel.

In another form, an exhaust system of an engine providing exhaust to an exhaust fluid flow pathway is provided that includes at least one exhaust aftermath treatment system disposed in the exhaust fluid flow pathway. A bypass conduit is coupled to the exhaust fluid flow pathway at an upstream location from at least one exhaust aftertreatment system. A heater is disposed within the bypass conduit.

In still another form, an exhaust system is provided that includes at least one exhaust aftertreatment system provided in an exhaust fluid flow pathway and a regeneration device disposed downstream from at least one exhaust aftertreatment system. The regeneration device includes at least one valve, wherein actuating the regeneration device restricts the exhaust fluid flow.

In yet another form, the teachings of the present disclosure may be applied to a fluid conduit without a bypass. Accordingly, a fluid heating system is provided that comprises a fluid conduit, a heater disposed within the fluid conduit, and a mechanism operable to be actuated when the heater is turned on to change at least one of a shape, position, orientation, and location of the heater.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
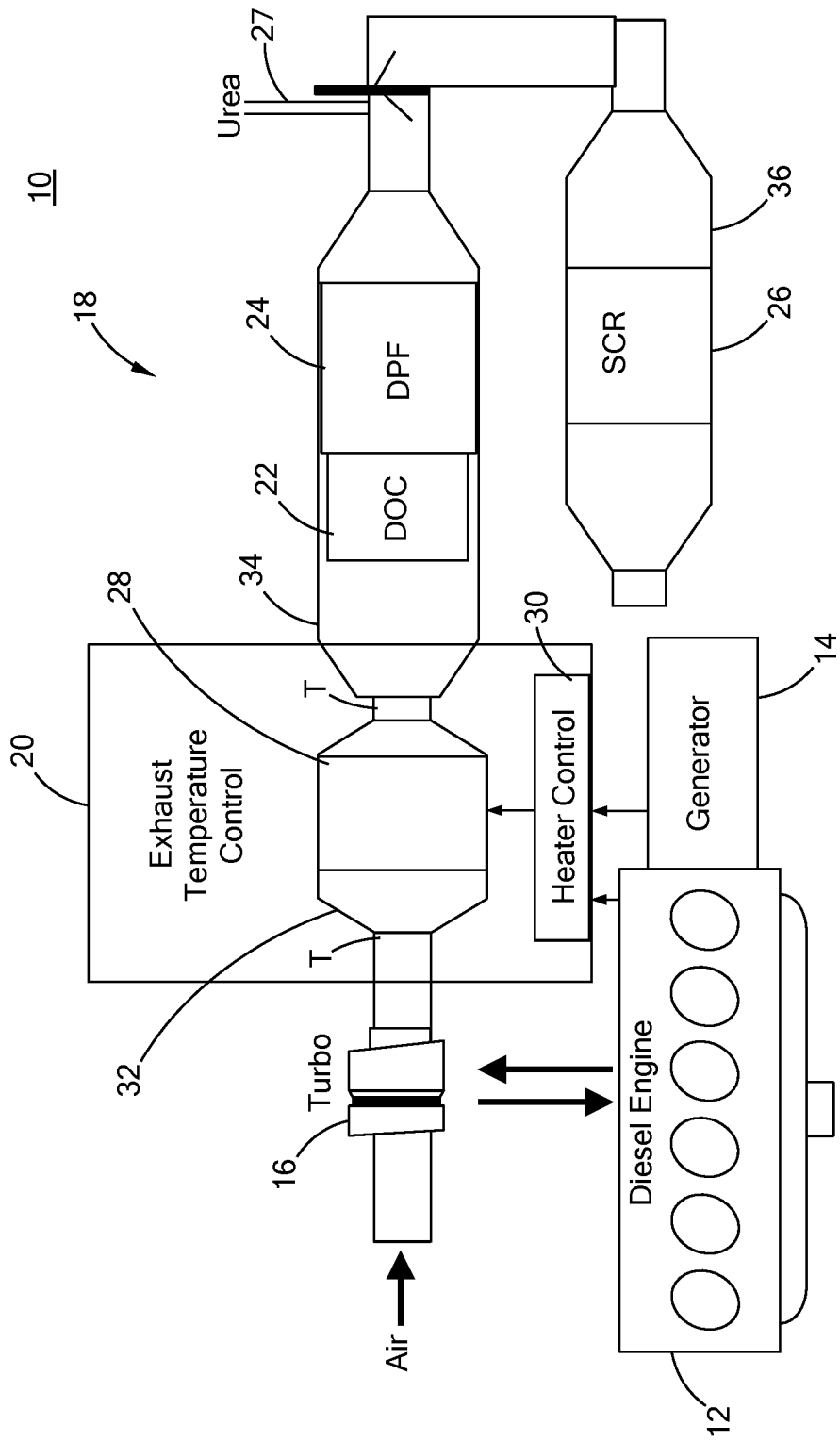
FIG. 1 is schematic diagram of a diesel engine and exhaust aftertreatment system in which the principles of the present disclosure are applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an exemplary engine system 10 generally includes a diesel engine 12, an alternator 14 (or generator in some applications), a turbocharger 16, and an exhaust aftertreatment system 18. The exhaust aftertreatment system 18 is disposed downstream from the turbocharger 16 for treating exhaust gases from the diesel engine 12 before the exhaust gases are released to atmosphere. The exhaust aftertreatment system 18 can include one or more additional components, devices, or systems operable to further treat exhaust fluid flow to achieve a desired result. In the example of FIG. 1, the exhaust aftertreatment system 18 includes a heating system 20, a diesel oxidation catalyst (DOC) 22, a diesel particulate filter device (DPF) 24, and a selective catalytic reduction device (SCR) 26. The heating system 20 includes a heater assembly 28 disposed upstream from the DOC 22, and a heater control device 30 for controlling operation of the heater assembly 28. The exhaust aftertreatment system 18 further includes an upstream exhaust conduit 32 that receives the heater assembly 28 therein, an intermediate exhaust conduit 34 in which the DOC 22 and DPF 24 are received, and a downstream exhaust conduit 36 in which the SCR is disposed. Although a diesel engine 12 is shown, it should be understood that the teachings of the present disclosure are also applicable to a gasoline engine and other fluid flow applications. Therefore, the diesel engine application should not be construed as limiting the scope of the present disclosure.

The DOC 22 is disposed downstream from the heater assembly 28 and serves as a catalyst to oxide carbon monoxide and any unburnt hydrocarbons in the exhaust gas. In addition, The DOC 22 converts nitric oxide (NO) into nitrogen dioxide ($NO_2$). The DPF 24 is disposed downstream from the DOC 22 to remove diesel particulate matter (PM) or soot from the exhaust gas. The SCR 26 is disposed downstream from the DPF 24 and, with the aid of a catalyst, converts nitrogen oxides (NOx) into nitrogen ($N_2$) and water. A urea water solution injector 27 is disposed downstream from the DPF 24 and upstream from the SCR 26 for injecting urea water solution into the stream of the exhaust gas. When urea water solution is used as the reductant in the SCR 18, NOx is reduced into $N_2$, $H_2O$ and $CO_2$.

It should be understood that the engine system 10 illustrated and described herein is merely exemplary, and thus other components such as a $NO_x$ adsorber or ammonia oxidation catalyst, among others, may be included, while other components such as the DOC 22, DPF 24, and SCR 26 may not be employed. Further, although a diesel engine 12 is shown, it should be understood that the teachings of the present disclosure are also applicable to a gasoline engine and other fluid flow applications. Therefore, the diesel engine application should not be construed as limiting the scope of the present disclosure. Such variations should be construed as falling within the scope of the present disclosure.

Figure 2:
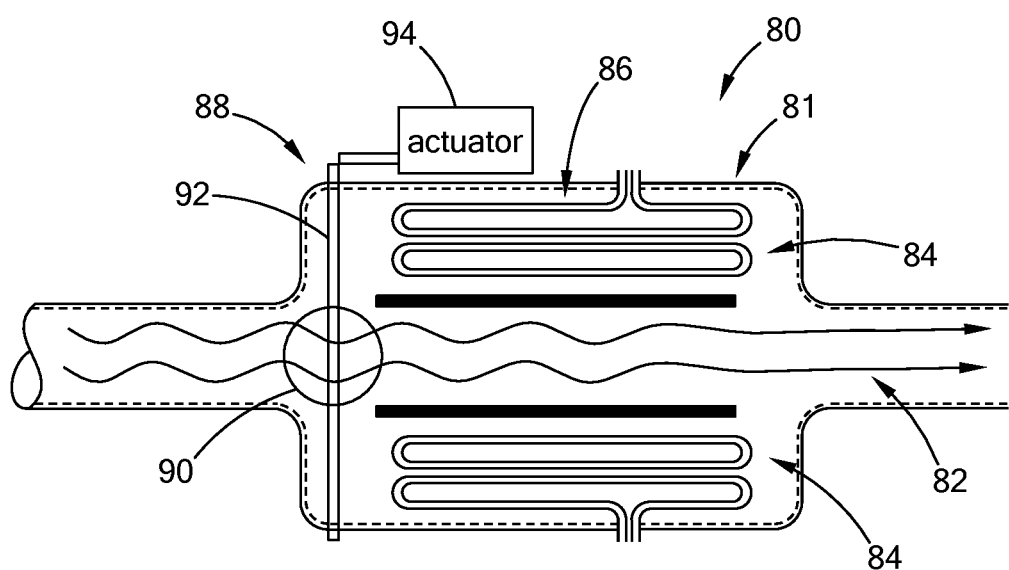
FIG. 2 is a schematic view of a flow control device provided in an upstream exhaust conduit according to the teachings of the present disclosure.

Referring to FIG. 2, one form of the present disclosure has a fluid control system 80 disposed in an upstream exhaust conduit 81. The upstream exhaust conduit 81 in one form defines a first flow channel 82 and a second flow channel 84 surrounding the first flow channel 82. The first flow channel 82 can be an inner flow channel and the second flow channel 84 an outer flow channel surrounding the first/inner flow channel 82. In the example of FIG. 2, the second flow channel 84 is in fluid communication with the first flow channel 82. The first and second flow channels 82, 84 are in a fluid flow path of the exhaust system, such as the exhaust system of FIG. 1. A heater 86 is disposed in the second flow channel 84. A fluid control device 88 is provided upstream of the first and second flow channel 82, 84 to control the flow path of the exhaust gas. The fluid control system 80 further includes an actuator 94 coupled to the fluid control device 88 and adapted to actuate the fluid control device 88 when the heater 86 is turned on. The fluid control device 88 may direct the exhaust gas through both the first and second flow channels 82, 84 during normal engine operation when the heater 86 is not activated. The fluid control device 88 is actuated when the heater 86 is turned on. Actuating the fluid control device 88 causes the first flow channel 82 to change a fluid flow rate in at least one of the first flow channel 82 and the second flow channel 84. Actuating the fluid control device 88 in one form causes fluid to flow through the second flow channel 84, in another form prevents fluid from flowing through the first flow channel 82 when fluid is flowing through both channels, and in another form partially re-directs a portion of the fluid flow through the second flow channel 84.

In another form of the present disclosure, the exhaust gas can be directed through only one of the first flow channel 82 and the second flow channel 84 during normal engine operation. In this configuration, the second flow channel 82 functions as a bypass channel. When the heater 86 is not actuated, the exhaust gas is directed through only the first flow channel 82. When the heater 86 is actuated, the exhaust gas is directed through only the second flow channel 84. A fluid control device 88 is provided upstream of the first and second flow channels 82, 84 to control the flow path of the exhaust gas.

Figure 3:
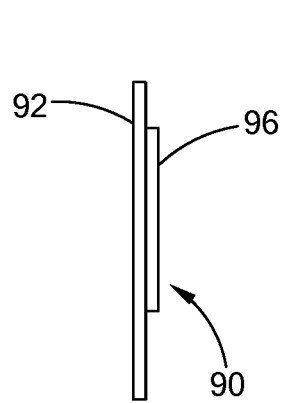
FIG. 3 is a side view of the flow control device of FIG. 2.
Figure 4:
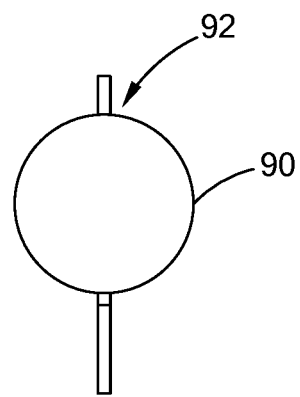
FIG. 4 is a front view of the flow control device of FIG. 2.

Referring to FIGS. 2 through 4, in one form of the present disclosure, the flow control device 88 includes a flapper member 90, a support member 92. The support member 92 can be in the form of a bar extending from opposing ends of the flapper member 90 and the actuator 94. The flapper member 90 is disposed upstream from the first and second flow channels 82, 84. In one form, flapper member 90 defines a plate body having a position normal to the flow of exhaust gas. When the heater 86 is not activated, the flapper member 90 is positioned such that the normal direction is perpendicular to the longitudinal axis of the first flow channels 82 and the exhaust gas is allowed to pass through the first flow channel 82. When the heater 86 is activated, the flapper member 90 is positioned such that its normal direction is parallel to the longitudinal axis of the first flow channel 82 to close the first flow channel 82.

The flow control device 88 is actuated to position the flapper member 90 in a different position based on the status of the heater 86 disposed in the second flow channel 84. When regeneration is necessary, the heater 86 is turned on to heat the exhaust gas flowing through the heater 36. The heat from the heater 86 causes the flow control device 88 to be actuated to direct the flow the exhaust gas through the second flow channel 84, thereby controlling the flow rate of the exhaust gas.

Optionally, the flow control device 88 may include one or more actuating surfaces 96 that can cause actuation of the flow control device 88 by thermal energy. The thermal energy can be provided through a number of sources, including by way of example, heat from the heater 86, a reaction to a change in temperature of the heater, the exhaust gas, a reaction to a change in temperature of the exhaust gas, differential thermal expansion, and combinations thereof. When regeneration is necessary and the heater 86 is turned on, the actuating surface 96 faces the heater 86 and thus is heated. The heated actuating surface 96 may transmit a signal to the actuator 94, causing the actuator 94 to position the flow control device 88 to change the flow path and/or flow rate of the exhaust gas as previously described.

The flow control device 80 may include a flapper valve, butterfly valve, or a similar structure. The actuator 94 may include a material such as a shape memory alloy that changes shape in response to heat or temperature change. In one form of the present disclosure, the flapper member 94 can be made of the shape memory alloys that change shape in response to a temperature or temperature change associated with heater operation. The flow control device 80 can change its position due to the changed shape of the flapper member 94. In another form, the flapper member 94 can be made of bi-metallic construction where a temperature associated with heater operation causes a displacement for actuating flow control device 90. The actuation of the flow control device 90 may be directly actuated by the actuating surface 96 or through the external actuator 94.

Figure 5:
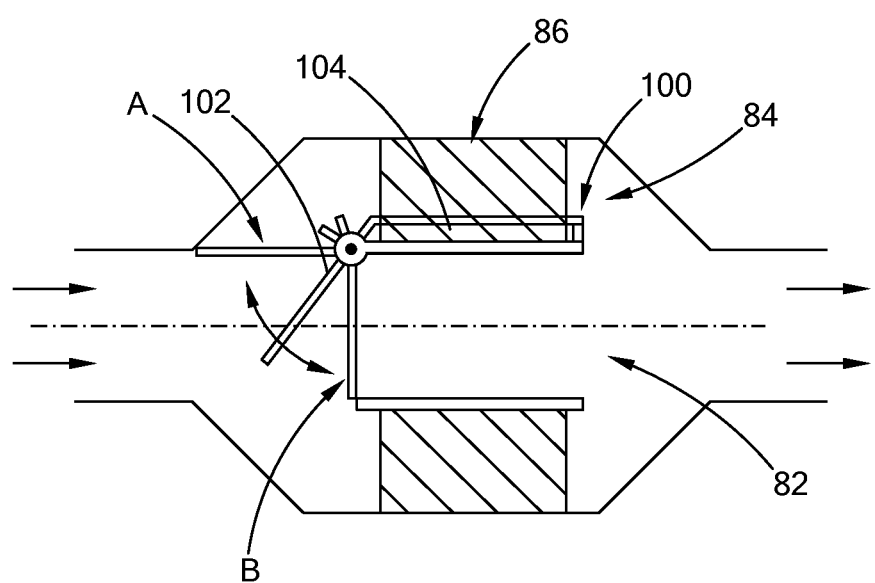
FIG. 5 is a schematic view of another form of a flow control device provided in an upstream exhaust conduit according to the teachings of the present disclosure.

Referring to FIG. 5, another form of a flow control device 100 is provided according to the present disclosure. The flow control device 100 includes a pivoting member 102 and an actuating member 104. As shown, the actuating member 104 is disposed proximate a wall of the first flow channel 82 and in contact with the heater 86. The pivoting member 102 is pivotably connected to the actuating member 84 and is pivotable to move between an open position A (where the first flow channel 82 is open) and a closed position B (where the first flow channel 82 is closed). The pivoting member 102 can further be operable to pivot and reduce fluid flow through first flow channel 82 by being positioned somewhere between a fully open and a fully closed position. In one form, when the heater 86 is not actuated, the pivoting member 102 is in the open position to allow the exhaust gas to flow through the first flow channel 82. When regeneration is necessary and the heater 86 is turned on, heat is applied to the actuating member 104 and causes the actuating member 104 to change its shape. The changed shape triggers the pivoting member 102 to move from the open position A to the closed position B or somewhere in between. In a fully closed position B, the first flow channel 82 is closed thereby preventing fluid flow through the first flow channel 82 and opening the second flow channel 84 in which the heater 86 is disposed. As a result, the exhaust gas is directed through the second flow channel 84 and heated by the heater 86.

Figure 6:
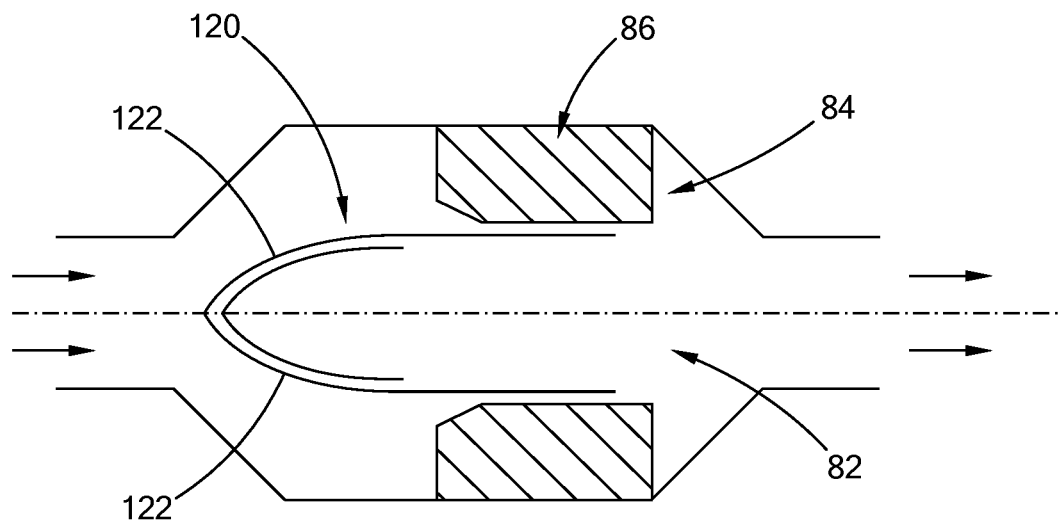
FIG. 6 is a schematic view of yet another form of a flow control device in a closed position provided in an upstream exhaust conduit according to the teachings of the present disclosure.
Figure 7:
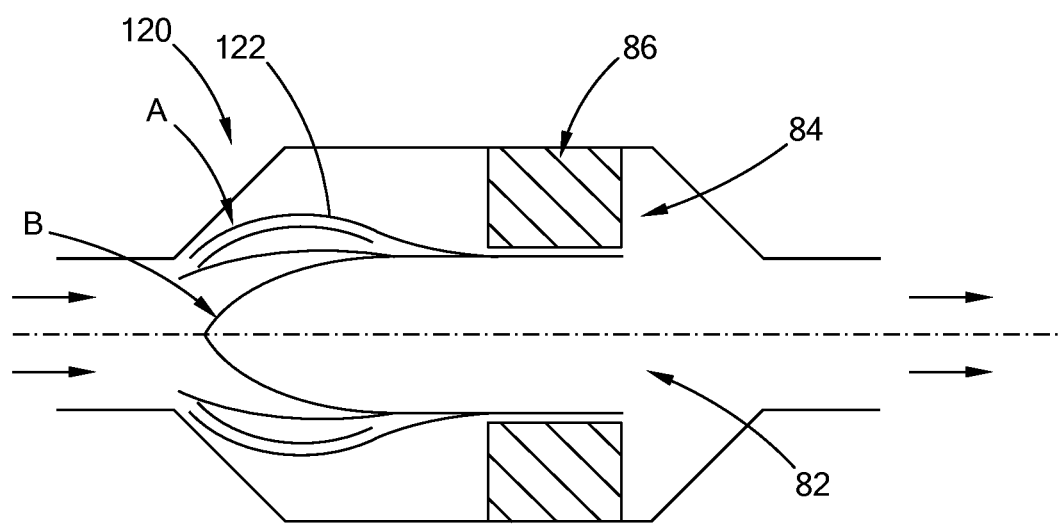
FIG. 7 is a schematic view of the flow control device of FIG. 6 in an open position.

Referring to FIGS. 6 and 7, a flow control device 120 according to another form of the present disclosure includes multiple flexing members 122 that may be of a bi-metallic construction and mounted proximate a wall that defines the first flow channel 82 and positioned near the heater 86. The flexing members 122 are movable between an open position A (where the first flow channel 84 is open) and a closed position B (where the first flow channel 84 is closed). This includes various positions between position A and position B. When the heater 86 is not turned on, the flexing members 122 can be in the open position A to open the first flow channel 82 and to block or reduce fluid flow through the second flow channel 84. When regeneration is necessary and the heater 86 is actuated, the flexing members 122 change their shape and move toward each other to the closed position B to close or reduce fluid flow through the first flow channel 82. The exhaust fluid is then directed through the second flow channel 84 and is heated by the heater 86 therein.

The flow control device 120 can be directly actuated by the operation of the heater 86 without using a separate actuator, such as a motor, solenoid, air cylinder or hydraulic cylinder, and associated control logic. Therefore, an opening through the exhaust pipe may not be needed in order to connect the flow control device 120 to an external actuator and thus leakage of exhaust gas through such an opening would not occur. The flow control device 120 of this form can reduce manufacturing costs and structural complexity.

Figure 8:
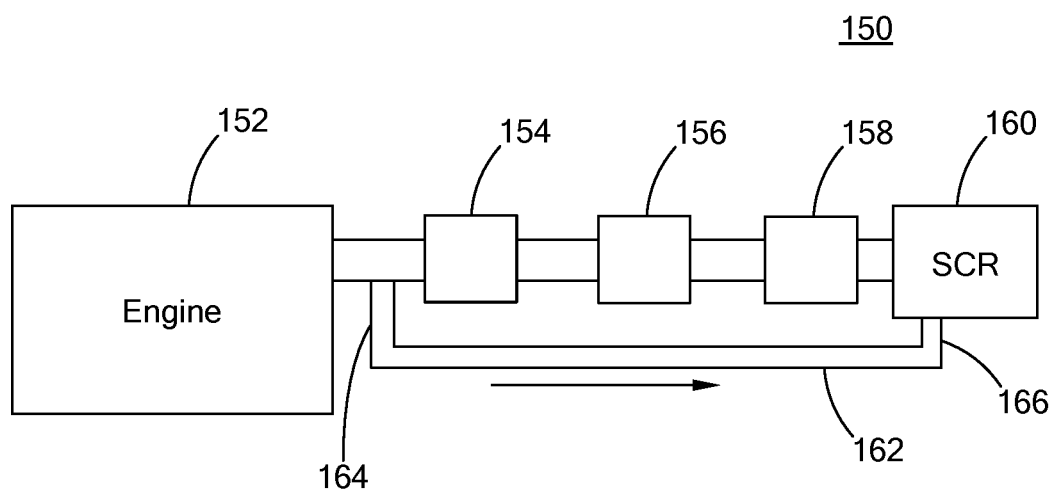
FIG. 8 is a schematic view of an exhaust system according to another form of the present disclosure.

Referring to FIG. 8, an engine system 150 is provided in accordance with another form of the present disclosure and includes a diesel engine 152, an exhaust aftertreatment system, including various exhaust treatment units 154, 156, 158, and an SCR 160. The various exhaust treatment units 154, 156, 158 may be any combination of a catalytic converter, a DPF, a DOC, an LNT, an ammonia slip catalyst, or reformers, depending on the application. The engine system 150 further includes a bypass conduit 162 coupled to the exhaust fluid flow having an inlet 164 disposed upstream of the various exhaust treatment units 154, 156, 158 and an outlet 166 disposed at a downstream of the various exhaust treatment units 154, 156, 158, which is also an inlet of the SCR 160.

Figure 9:
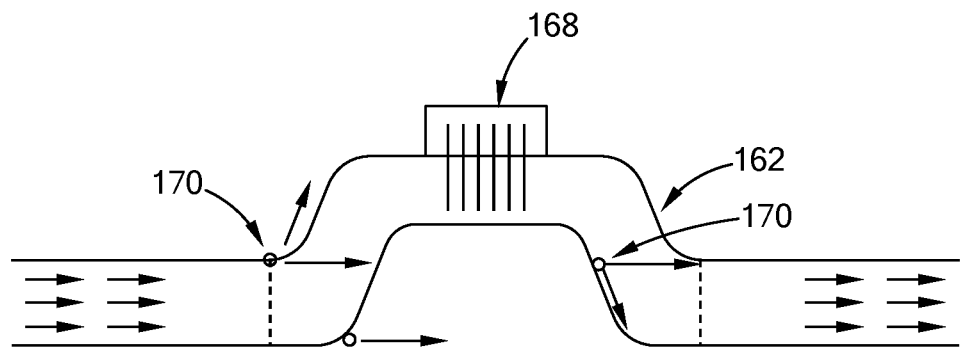
FIG. 9 is a schematic view of a bypass channel where flow control devices are installed at an inlet and an outlet of the bypass channel according to the teachings of the present disclosure.

Referring to FIG. 9, a heater 168 is provided in the bypass conduit 162. Flow control devices 170 as shown in FIGS. 2 to 7 are disposed at the inlet 164 and outlet 166 of the bypass conduit 162. In one form, during normal engine operation, the bypass conduit 162 is closed. When regeneration is necessary, the flow control devices 170 may open the inlet 164 of the bypass conduit 162 so that the exhaust gas is redirected through the bypass conduit 162 to be heated by the heater 168. Furthermore, when regeneration is necessary, the flow control device 170 positioned near the outlet 166 of the bypass conduit 162 may close the outlet 166 of the bypass conduit 162 to allow for the exhaust gas to be heated by the heater 168. By providing a bypass conduit 162 separate from the main exhaust path and by providing the heater 168 in the bypass conduit 162, the exhaust gas can more smoothly flow in the bypass conduit 162. Therefore, backpressure caused by the presence of the heater 168 in the main flow path as shown in FIGS. 2 to 7 can be reduced.

Figure 10:
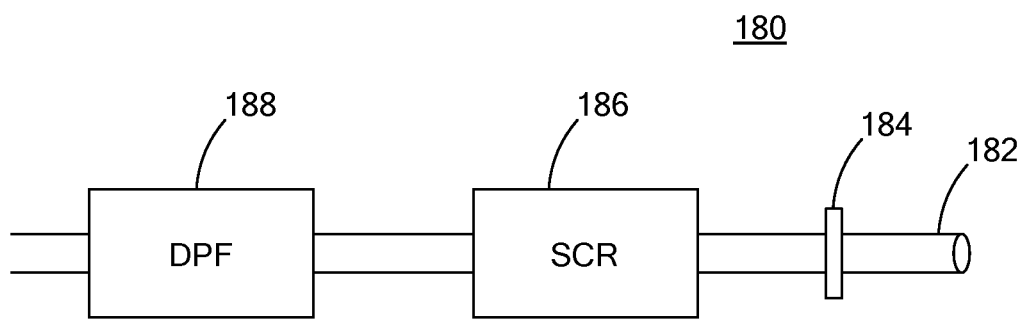
FIG. 10 is a schematic view of still yet another form of an exhaust system according to of the teachings of the present disclosure.

Referring to FIG. 10, the exhaust system 180 may include an exhaust aftertreatment system as shown in FIG. 8, and a regeneration device 182 including at least one valve 184 disposed downstream of an SCR 186 and a DPF 188. When regeneration is activated, the regeneration device 182 may close an outlet of the exhaust pipe downstream from the SCR 186. By closing the outlet, the exhaust gas remains in the DPF 188 and SCR 186 and increases the gas pressure inside the DPF 188 and the SCR 186. The increased pressure causes the temperature of the exhaust gas to increase, resulting in burning of the particles in the DPF 188 and facilitating SCR process in the SCR unit 186.

The teachings of the present disclosure may also be used within a single conduit or fluid flow channel without being limited to a bypass channel. A heater actuated mechanism may be employed that would change the position, orientation, angle of attack or other geometric characteristic of the heater to allow it to improve heat transfer when the heater is on and to allow it to shift into a position that reduces drag/backpressure when the heater is off. Such a mechanism may be attached directly to the heater or parts of the heater (e.g. a metal member attached directly to the heater surface that would move the heater by differential thermal expansion). Such a mechanism may include any of the fluid control devices and materials as disclosed herein, such as a shape memory alloy.

In other forms, each of the elements illustrated herein can be positioned or reconfigured such that they are aligned with the fluid flow rather than being arranged across the flow. Also, another separate bypass could be employed to divert flow around the heater, similar to a piping system. These variations and configurations should be construed as falling within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A fluid control system comprising:
    a first flow channel;
    a second flow channel;
    a heater including a resistive heating element disposed within the second flow channel;
    a fluid control device, wherein actuating the fluid control device increases a fluid flow rate from a conduit to the second flow channel and decreases a fluid flow rate from the conduit to the first flow channel; and
    an actuator adapted to cause actuation of the fluid control device in response to thermal energy from the heater.

2. The fluid control system according to claim 1, wherein the first flow channel is an inner flow channel and the second flow channel is an outer flow channel surrounding the inner flow channel.

3. The fluid control system according to claim 1, wherein the second flow channel is a bypass channel disposed outside of a fluid flow path of the fluid control system.

4. The fluid control system according to claim 1, wherein the first flow channel and second flow channel are disposed in a main fluid flow pathway of an exhaust system.

5. The fluid control system according to claim 1, wherein the actuator is coupled to the fluid control device, wherein the actuator is adapted to actuate the fluid control device when the heater is turned on.

6. The fluid control system according to claim 5, wherein the actuator is powered by thermal energy.

7. The fluid control system according to claim 1, wherein the thermal energy is provided by a source selected from the group consisting of the heater, a reaction to a change in temperature of the heater, the fluid flowing in the at least one of the first flow channel and the second flow channel, a reaction to a change in temperature of the fluid, differential thermal expansion, and combinations thereof.

8. The fluid control system according to claim 1, wherein the fluid control device includes a flapper member, the flapper member engaged with the actuator and operable for restricting fluid flow from the conduit to the first flow channel when positioned by the actuator during actuation of the fluid control device.

9. The fluid control system according to claim 8, wherein the flapper member comprises a plate body adapted to change in position in response to heat from the heater to restrict fluid flow through the first flow channel.

10. The fluid control system according to claim 8, wherein the fluid control device includes at least one actuating surface supported on the flapper member, the actuating surface, when heated by the heater, being operable to cause the actuator to position the flapper member to cause fluid flow through the second flow channel.

11. The fluid control system according to claim 8, wherein the actuator includes a material selected from the group consisting of a shape memory alloy, a bimetallic construction, and combinations thereof.

12. The fluid control system according to claim 11, wherein the fluid control device is adapted to change position when the actuator changes shape to restrict fluid flow through the first flow channel.

13. The fluid control system according to claim 1, wherein the fluid control device includes at least one pivoting member pivotably connected to at least one actuating member disposed proximate a wall of the first flow channel positioned near the heater, wherein the at least one pivoting member actuates to restrict flow through the first flow channel when actuated by the at least one actuating member when the heater is turned on.

14. A fluid heating system comprising:
    an exhaust conduit configured to be coupled to an engine to receive exhaust gas from the engine;
    a first fluid conduit coupled to the exhaust conduit for fluid communication therewith;

a second fluid conduit to the exhaust conduit for fluid communication therewith;

a heater configured to heat the exhaust gas, the heater disposed within the second fluid conduit; and a mechanism including a member and an actuator adapted to cause actuation of the member in response to thermal energy from the heater such that the member changes at least one of a shape, position, and orientation of the member so that exhaust flowing from the exhaust conduit to the first fluid conduit is at least partially diverted to flow from the exhaust conduit to the second fluid conduit.

15. The fluid heating system according to claim 14, wherein the mechanism is a separate element attached to the heater.

16. The fluid heating system according to claim 14, wherein the mechanism is integral to the heater.

17. A fluid control system comprising:

a first flow channel;

a second flow channel coupled to the first flow channel for fluid communication therewith;

a heater including a heating element disposed within the second flow channel;

a fluid control device disposed upstream or downstream from the first and second flow channels, wherein actuating the fluid control device changes a fluid flow rate in at least one of the first flow channel and the second flow channel, the fluid control device including a flapper member operable for restricting fluid flow between the first and second flow channels; and an actuator adapted actuate the fluid control device, the actuator engaged with the flapper member and configured to change a position of the flapper member in response to heat from the heater to restrict fluid flow through the first flow channel.

18. The fluid control system according to claim 1 further comprising an exhaust aftertreatment unit downstream of the first flow channel and the second flow channel, the exhaust aftertreatment unit including one of a catalytic converter, a diesel particulate filter, a diesel oxidation catalyst, a lean $NO_x$ trap, an ammonia slip catalyst, a reformer, and combinations thereof.

19. A fluid control system comprising:

a first flow channel;

a second flow channel;

a heater including a resistive heating element configured to heat a fluid flowing in at least one of the first flow channel and the second flow channel, the resistive heating element being disposed proximate the at least one of the first flow channel and the second flow channel;

a fluid control device, wherein actuating the fluid control device increases a fluid flow rate from a conduit to the second flow channel and decreases a fluid flow rate from the conduit to the first flow channel; and an actuator adapted to cause actuation of the fluid control device in response to thermal energy from the heater, wherein the first flow channel is an inner flow channel and the second flow channel is an outer flow channel surrounding the inner flow channel.

* * * * *